United States Patent
Yamanaka et al.

[11] Patent Number: 6,099,765
[45] Date of Patent: Aug. 8, 2000

[54] OPTICAL COMPONENT FORMATION METHOD

[75] Inventors: Hajime Yamanaka, Omiya; Yasuhiko Sato, Iwatuki, both of Japan

[73] Assignee: Fuji Photo Optical Co., Ltd., Omiya, Japan

[21] Appl. No.: 09/249,161

[22] Filed: Feb. 12, 1999

[30] Foreign Application Priority Data

Mar. 31, 1998 [JP] Japan ................... 10-103930

[51] Int. Cl.$^7$ ............ B29D 11/00; C03B 11/00; C03B 23/00
[52] U.S. Cl. .................. 264/2.4; 65/64; 65/102; 65/104; 65/286; 65/305; 264/1.21; 264/2.7; 425/808
[58] Field of Search ............ 264/2.7, 2.4, 1.1, 264/2.2, 1.21; 65/64, 102, 83, 85, 275, 77, 104, 286, 305; 425/808

[56] References Cited

U.S. PATENT DOCUMENTS

| | | |
|---|---|---|
| 4,778,505 | 10/1988 | Hirota et al. . |
| 4,915,720 | 4/1990 | Hirota et al. . |
| 5,032,160 | 7/1991 | Murata et al. . |
| 5,188,650 | 2/1993 | Nomura . |
| 5,228,894 | 7/1993 | Sato et al. . |
| 5,817,161 | 10/1998 | Takagi et al. . |

FOREIGN PATENT DOCUMENTS

| | | |
|---|---|---|
| 62-96328 | 5/1987 | Japan . |
| 2-102133 | 4/1990 | Japan . |
| 2-208228 | 8/1990 | Japan . |
| 2-252629 | 10/1990 | Japan . |
| 3-69520 | 3/1991 | Japan . |
| 5-221664 | 8/1993 | Japan . |
| 6-9228 | 1/1994 | Japan . |
| 6-92656 | 4/1994 | Japan . |
| 8-208243 | 8/1996 | Japan . |
| 8-245228 | 9/1996 | Japan . |
| 9-132417 | 5/1997 | Japan . |

*Primary Examiner*—Mathieu D. Vargot
*Attorney, Agent, or Firm*—Arnold International; Clyde I. Coughenour; Bruce Y. Arnold

[57] ABSTRACT

A method of forming an optical component wherein imperfections in molding the optical component, such as a lens, are removed by: heating an optical material to its plastic state; forming the optical material into the desired shape by employing a mold apparatus and applying a molding pressure; releasing all pressure from the shaped optical material by separating sections of the mold in order to relieve internal stress in the optical material while the optical material is at its plastic state temperature; slowly and controllably reducing the temperature of the optical material. At the time of, or shortly after commencing the slow and controlled reduction in temperature of the optical material, applying a more moderate pressure on the optical material while it is still in its plastic state; either maintaining the moderate pressure on the optical material during its controlled, gradual cooling until a solid state temperature is reached, or alternatively, after a period of time gradually reducing the pressure applied to the mold until a solid state temperature is reached; and, after said solid state temperature is reached, exposing the mold with enclosed optical material to ambient or room temperature without adding heat to thereby rapidly cool the optical material while applying a light pressure on the optical material. A light pressure, corresponding to that produced by the weight of the upper mold when supported by the optical material, can be applied for a time when the optical material is in its plastic state coincident with the molding pressure being released, or application of the molding pressure can be preceded by successive steps of increased pressure. Further, after applying the moderate pressure, the pressure can be gradually relieved as the temperature of the optical material is gradually lowered.

20 Claims, 8 Drawing Sheets

(A)

(B)

(C)

(D)

OPTICAL COMPONENT FORMATION METHOD

BACKGROUND OF THE INVENTION

1. Field of the Invention

The present invention is a process of forming optical components, such as lenses, by heating and pressing an optical material in a mold while controlling the temperature and pressure as a function of time.

2. Description of Related Art

It has been conventional to shape optical components by grinding and polishing optical materials such as crown glass, flint glass, etc., so as to form, for example, lenses. In recent years relatively small diameter aspherical surface lenses made from optical glass have been press-formed in molds. Optical material in pillar, cylinder or ball shapes are placed on the lower portion of a two-section mold that is usually concave on its upper surface, with the concavity in the shape of a lens lower surface. An upper mold is provided having a concavity being in the shape of the lens upper surface. A heating device is provided to heat the optical material and a drive mechanism is provided to press the two mold sections together. The optical glass placed on the lower mold section is heated until it is soft and deformable under pressure. This is referred to as the plasticization temperature or plastic state. When molding glass, the glass is heated above its transition point, which is the minimum temperature necessary for molding. With the plasticization temperature maintained, either or both of the mold sections may be moved, but usually the upper mold is lowered so as to apply pressure on the optical material. The shaped optical material is then gradually cooled and pressure is applied to it between the upper and lower mold sections. The rate of temperature drop is controlled so that cooling is at a slower rate than it would be if the mold apparatus with enclosed optical component were exposed to room or ambient temperature and natural cooling occurred. After the controlled temperature drop, the mold apparatus with enclosed optical material (now a formed optical component such as a lens) is then naturally cooled by exposure to ambient or room temperature. After the optical component has cooled, it is removed by separating the mold sections.

However, sometimes air is trapped between the optical material and a mold section, usually as a result of the initial shape of the optical material that is placed in the mold including a flat surface and the mold section having a concave surface, resulting in a gap when the mold section first contacts the optical material. Due to air being trapped in such a gap, the shape of the mold will not accurately be transferred to the optical component being molded. The problem of trapping air is not pronounced when using an optical material that is initially ball-shaped, because of the outward spread of the optical material from the initial point of contact with the mold section. However, the problem is known to occur where the staring optical material is pillar-shaped or cylindrical in shape. To prevent this defect, the trapped air must be expelled during the molding process. Various prior art methods have been proposed for expulsion of the trapped gas in the case where the starting shape of the optical material is pillar-shaped or cylindrical in shape.

One such process for removing trapped gas releases the pressure from the mold sections once during the initial pressing step. The pressure relief expels gas from the mold. After the gas is expelled, the temperature is gradually lowered while the prior formation pressure (herein termed the molding pressure) is re-applied. The formed lens is then allowed to cool naturally with the only pressure on the lens being that of the weight of the upper mold section. This process is disclosed in Japanese Laid Open Patent Applications H02-102133 (1990), H02-252629 (1990), and H069228 (1994).

A second process is essentially the same as the first except that, during the gradual temperature reduction, the pressure is again relieved from the mold to again expel gas from the mold. This process is disclosed in Japanese Laid Open Patent Publication No. 3-69520 (1991).

A third process relieves pressure between the mold sections during the gradual temperature reduction in order to expel gas from the mold while the weight of the upper mold section is maintained on the lens during the natural cooling period. This process is disclosed in Japanese Laid Open Patent Publication H05-221664 (1993).

BRIEF SUMMARY OF THE INVENTION

The present invention is a procedure for forming an optical component, such as a lens. An optical material is heated to its plastic state under atmospheric pressure. Molding pressure is then applied to the plasticized optical material so as to form it into a desired shape of an optical component, as prescribed by the shape of the mold sections. The mold sections are then separated to relieve stress in the optical material and to release any gas trapped between a mold section and the optical material. A second pressing step applies an intermediate pressure to the optical material to correct irregularities created during the initial pressure formation and stress release steps. The second pressing step is commenced while the optical maternal is plastically deformable and is continued while the mold sections with enclosed optical material are gradually and controllably cooled to a temperature below the plastic state of the optical material The pressure is then relieved, but the mold sections are kept in contact with the optical material and the weight of the upper mold section is maintained on the optical material while the mold sections with enclosed optical material are subjected to natural cooling to room or ambient temperature.

Application of molding pressure while at the plastic state temperature of the optical material can be preceded by successive steps of increasing pressure, or can be followed after a period of time by releasing the molding pressure and immediately applying only the weight of the upper mold section on the optical material prior to removal of all pressure from the optical material, all while the temperature of the optical material is maintained in the plastic state. At the start of, or shortly after commencement of the controlled, gradual cooling of the optical material, an intermediate pressure (a pressure intermediate the molding pressure and the pressure resulting from the optical material supporting the weight of the upper mold section) may be applied until commencement of natural cooling. Alternatively, after the intermediate pressure has been applied for a time, the pressure on the optical material may be gradually reduced until only the weight of the upper mold section rests on the optical material Whether or not the intermediate pressure is gradually reduced during the period of controlled, gradual cooling of the optical material, during the period of natural cooling only the weight of the upper mold section rests on the optical material.

BRIEF DESCRIPTION OF THE DRAWINGS

The present invention will become more fully understood from the detailed description given below and the accompanying drawings, which are given by way of illustration only and thus are not limitative of the present invention, wherein.

DETAILED DESCRIPTION

Figure 1:
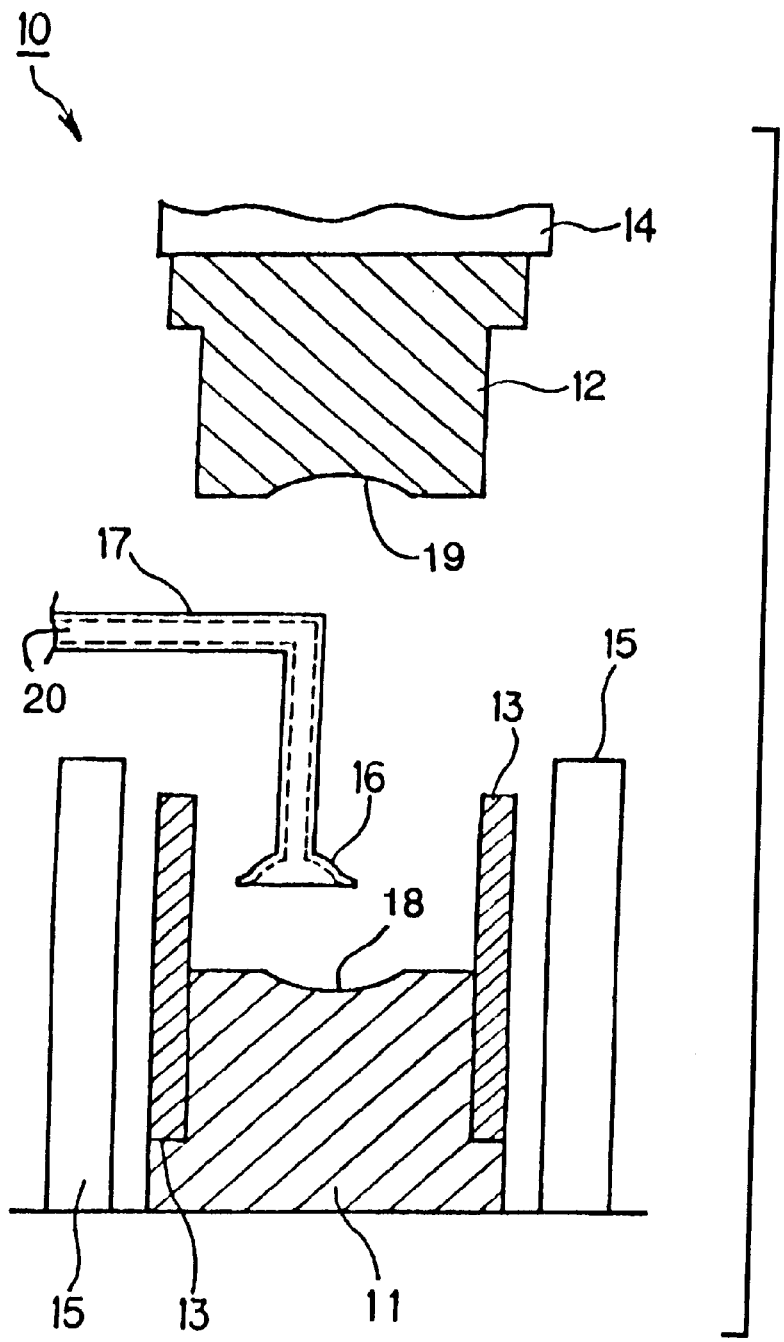
FIG. 1 shows a prior art mold apparatus of the type that can be used for forming an optical component according to the present invention.

FIG. 1 illustrates a prior art mold apparatus 10 of the type that can be used for forming optical components, such as lenses, of the present invention. The apparatus includes a lower mold section 11 and an upper mold section 12. A guide 13 is provided on the lower mold section 11 and acts to align the upper mold section 12. A drive mechanism 14 is shown attached to the upper mold section 12 for applying pressure to any material placed on the lower mold section or between the mold sections. A heater device 15 surrounds and extends above the lower mold section 11 and the guide 13 for heating the mold sections and any optical material placed on the lower mold section. A holding pad 16 having a funnel shape is attached to a robot arm 17 and is used for conveying and positioning optical material onto the lower mold section 11.

A first shaping component 18 in the shape of a lens lower surface is formed in the upper surface of the lower mold section 11. A second shaping component 19 in the shape of a lens upper surface is formed in the lower surface of the upper mold section 12. The holding pad 16 communicates with a passage 20 through the robot arm 17 connected to a vacuum source (not shown) for holding the optical material to the holding pad 16. The upper mold section 12 is attached to the drive mechanism 14 for moving the upper mold section toward the lower mold section and applying pressure between the upper and lower mold sections and for lifting the upper mold section away from the lower mold section. The drive mechanism 14 is provided with an electric motor, a pump driven by the electric motor, an oil pressure cylinder or equivalent (none of which are shown) and, by means of the driving mechanism, the upper mold section 12 is driven either towards or away from the lower mold section, (i.e., down or up in FIG. 1). The drive could instead be attached to the lower mold section, or a drive could be attached to each of the upper and lower mold sections. The lens formation apparatus 10 is provided with a pressure sensor (not shown) to indicate the pressure applied to the optical material between the mold sections. The guide 13 is arranged to position the upper mold section relative to the lower mold section and to thereby create accurate conformance between the upper and lower mold sections so that the molds can be repetitively separated and brought back together in precisely the same position. An electric heater is preferably used as the heat source for the heating device 15. The temperature of the optical material placed between the upper and lower mold sections is controlled with temperature sensors (not shown) placed on each of the mold sections The robot arm 17 is provided with a drive apparatus (not shown) and is constructed so that it can be moved both vertically and horizontally. The funnel-shaped holding pad 16 is formed from silicon rubber or the like, and has an opening in its center that communicates with the passage 20 in the robot arm A vacuum applied through the robot arm passage 20 allows the holding pad to hold the optical material when moving the optical material into and away from the mold apparatus. Removal of the vacuum acts to release the optical material from the holding pad.

Figure 2A:
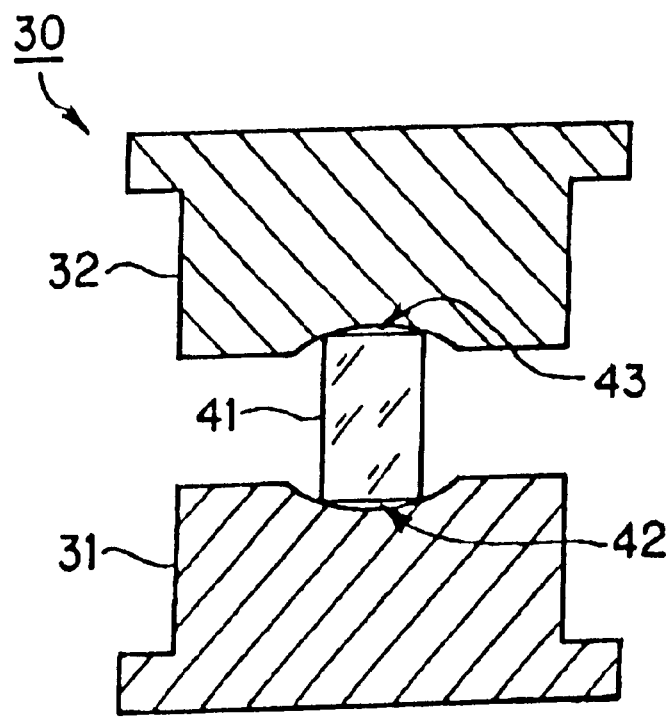
FIG. 2(A) shows a cross section of a cylindrical-shaped optical material placed between two sections of a prior art mold apparatus.
Figure 2B:
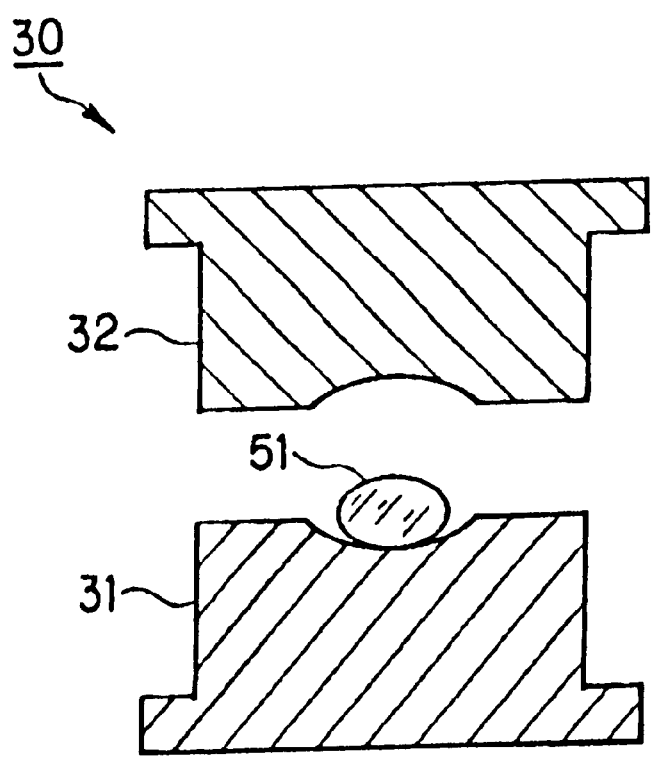
FIG. 2(B) shows a cross-section of an elliptical-shaped lens material placed between two sections of a prior art mold apparatus.

FIG. 2 depicts a prior art mold apparatus 30 with a lower mold section 31 and an upper mold section 32. Other components of the mold apparatus are omitted from this figure for clarity of illustration. A pillar or cylindrical-shaped optical glass or material is shown in FIG. 2(A) and a ball or oval-shaped optical material is shown in FIG. 2(B). As can be seen in FIG. 2(A), between the lower mold section 31 surface and the cylindrical optical material 41, a void area 42 is formed. Similarly, a void area 43 is formed between the upper mold section 32 surface and optical material 41. It is air in these void areas that can become trapped during the molding process when the mold sections are pressed together to form the lens. This prevents the optical material in the mold from forming an accurate impression of the mold cavity on the lens that is formed. In FIG. 2(B) the optical material 51 is in the shape of a ball or oval With this shape, air does not become trapped within the mold during the pressing of an optical component as easily as occurs with optical material having an initial shape which includes a flat surface.

Figure 3:
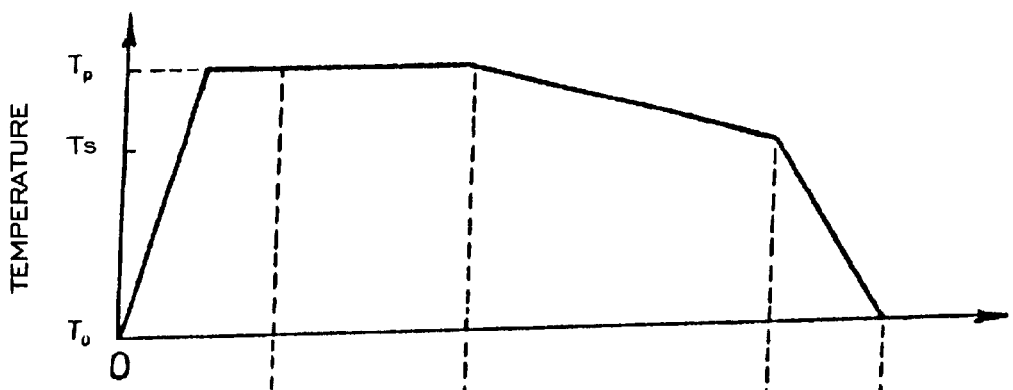
FIG. 3 illustrates the relationship between temperature and pressure versus time for several methods used to form optical components such as lenses according to the prior art.
Figure 3:
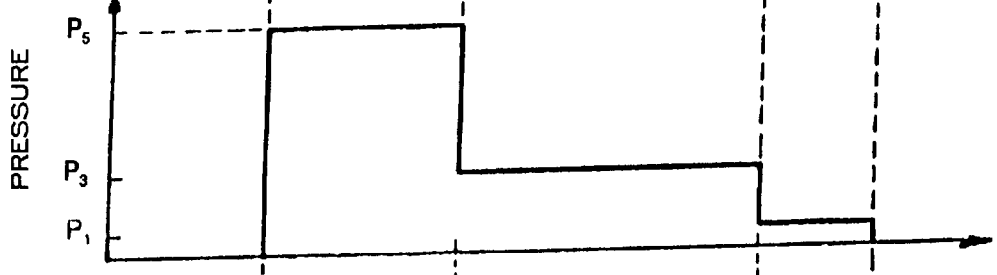
Figure 3:
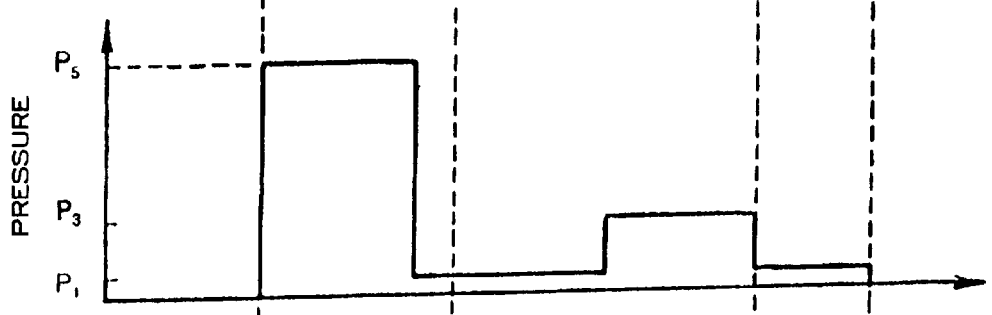
Figure 3:
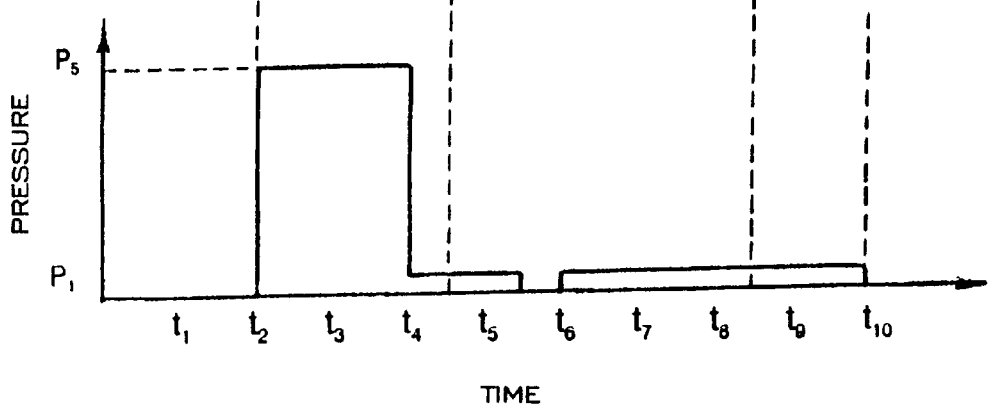

FIG. 3 shows graphs of prior art techniques that are known to have been used to prevent deformation in a formed optical component in the case where the initial shape of the optical material in the mold apparatus is ball or oval-shaped. FIG. 3(A) shows the temperature of the optical material used to form the optical component, such as a lens, versus time. The vertical axis represents temperature, and the horizontal axis represents the passage of time. The labels representative of specific temperatures on the vertical scale are merely for explanation of the process, as the actual temperatures employed will depend on the composition of the specific optical material used. Likewise, the labels representative of passage of time are also merely for explanation of the process, as the time required to heat and cool or otherwise subject the optical material to treatment also varies depending on the composition of the optical material used. $T_0$ represents room temperature. $T_p$ represents the temperature at which the optical material becomes plastic and is readily moldable. $T_s$ represents the temperature at which the optical material has cooled below its plastic state, is hot but relatively solid, and is the temperature at which the optical material is exposed to ambient or room temperature for rapid cooling. The time $t_1$ is the amount of time that it takes to heat the optical material from a solid at room temperature $T_0$ to its plastic, moldable state at a temperature $T_p$. This represents a first time period. The time $t_2$ is the time at which a molding pressure is first placed on the optical material. Between the time $t_2$ to a time about mid-way between $t_4$ and $t_5$ in FIG. 3, the temperature is maintained constant at $T_p$. This represents a second time period. At time about mid-way between $t_4$ and $t_5$, the temperature is gradually reduced until a time about mid-way between $t_8$ and $t_9$. This represents a third time period. At this time the optical material is exposed to room temperature so that it cools rapidly to room temperature. This represents a fourth time period. The downward slope of the temperature is generally indicative of the rate at which the optical material is cooled. FIGS. 3(B), 3(C) and 3(D) are representative of prior art procedures used for forming optical components and show the pressure applied to the optical material versus time. FIGS. 3(A) and 3(B) taken together are graphs of a first procedure; FIGS. 3(A) and 3(C) taken together are graphs of a second procedure, and FIGS. 3(A) and 3(D) taken together are graphs of a third procedure.

In the first prior art procedure illustrated by FIGS. 3(A) and 3(B), the optical material is heated as per FIG. 3(A) from ambient or room temperature $T_0$ to a temperature $T_p$ in its plastic state during a first time period (to time $t_1$). During a second time period, the temperature of the optical material is maintained constant. During a third time period the temperature of the optical material is gradually reduced. During a fourth time period, the temperature of the optical material is rapidly reduced. As illustrated in FIG. 3(B), at time $t_2$ molding pressure $P_5$ is initially applied to the optical material to form an optical component, such as a lens. The temperature is held constant at $T_p$ and the pressure is maintained at $P_5$ until a time between $t_4$ and $t_5$, at which point the temperature is then gradually lowered while a constant intermediate pressure $P_3$ is applied until a time about mid-way between $t_8$ and $t_9$. At this point in time the optical material is exposed to ambient or room temperature without heat being added while the pressure on the optical material is removed except for the pressure $P_1$ due to the weight of the upper mold section being supported by the optical material. The pressure $P_1$ is maintained on the optical material until the optical material reaches ambient or room temperature at time $t_{10}$. This procedure is generally disclosed in Japanese Laid Open Patent Publications S62-96328 (1987) and H09-132417 (1997).

FIGS. 3(A) and 3(C) combine to show a second procedure. The second procedure is similar to the first, except that the pressure $P_5$ is removed at about time $t_4$ so that the only pressure on the optical material is $P_1$, the pressure resulting from the weight of the upper mold section being supported by the optical material. This pressure is maintained until a time near $t_7$ is reached. At about time $t_7$ a pressure $P_3$, intermediate the pressure $P_5$ and the pressure $P_1$, is applied and remains until the beginning of the fourth time period. During the fourth time period (the period of rapid cooling to room temperature), only the weight of the upper mold section is applied to the optical material. This procedure is generally disclosed in Japanese Laid Open Patent Publications H02-208228 (1990), H08-208243 (1996) and H08-245228 (1996).

FIGS. 3(A) and 3(D) combine to show a third procedure. The third procedure is similar to the second procedure except that, for a brief period of time in the neighborhood of time $t_6$, the upper and lower mold sections are separated, removing all pressure from the optical material, and then only the weight of the upper mold section is reapplied to the optical material until the optical material is cooled to room temperature. This procedure is generally disclosed in Japanese Laid Open Patent Publication H06-92656 (1994).

Figure 4:
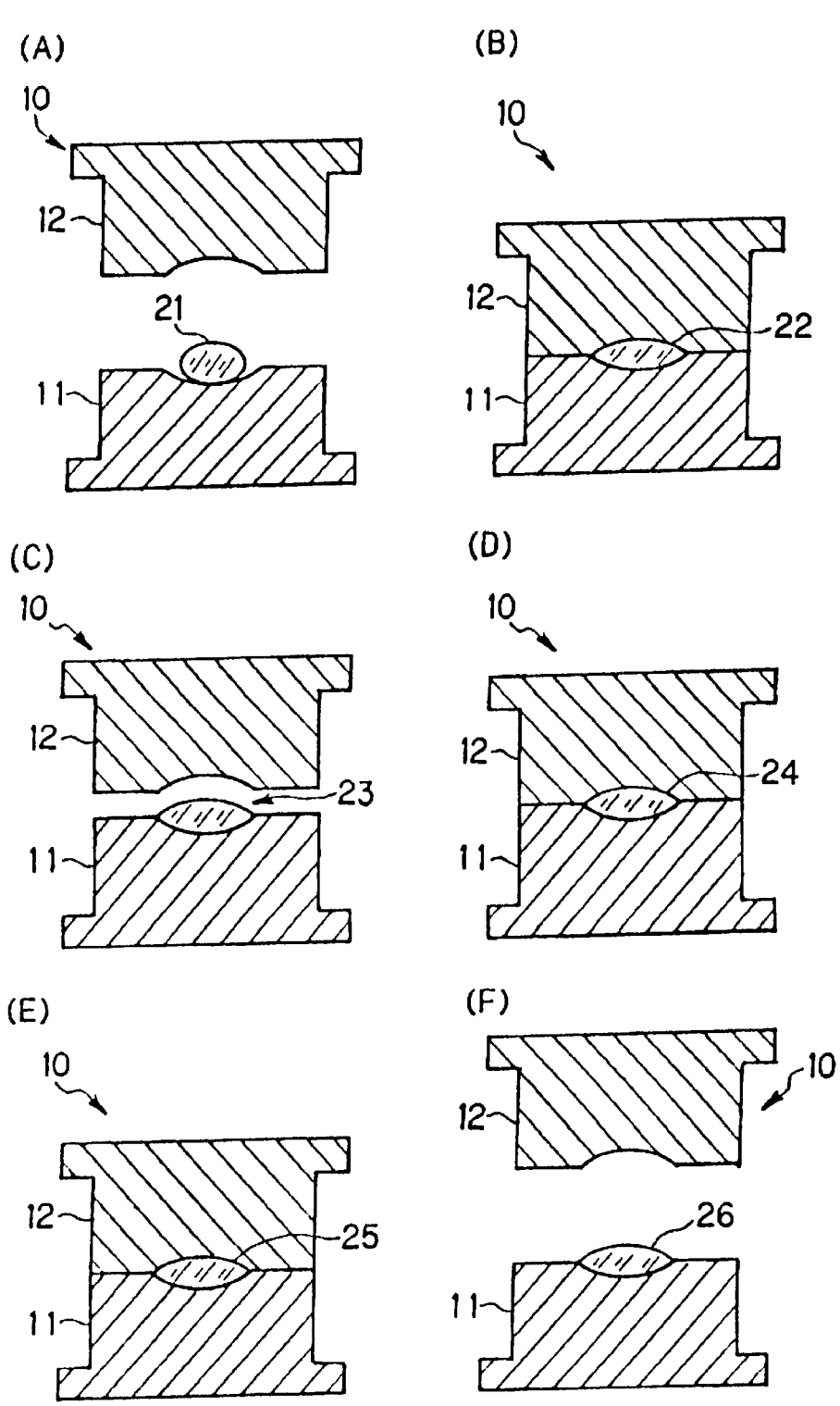
FIG. 4 shows the steps used to form an optical component according the present invention, with FIG. 4(A) showing the mold position during heating, FIG. 4(B) showing the initial pressure application, FIG. 4(C) showing the first mold separation to remove all pressure from the optical material, FIG. 4(D) showing the second pressure application, FIG. 4(E) showing the mold position during natural cooling, and FIG. 4(F) showing the mold position for removal of the optical component.

FIG. 4 depicts the major steps used to form the lens of the present invention. FIG. 4 will be described with reference to the temperature-time graph of FIG. 3(A). The only part of the mold apparatus shown is the lower mold section 11 and the upper mold section 12. As shown in FIG. 4(A), a ball or elliptically-shaped optical material 21 is placed in the lower mold cavity with the upper mold section spaced above the lower mold section and the optical material. With the mold sections and optical material in this position, heat is applied to raise the temperature of the mold sections and the optical material from room temperature To to a temperature $T_p$ at which the optical material is in its plastic state This temperature increase takes place over the time interval from $t_0$ to $t_1$, herein referred to as the first time period. For glass, the temperature would be raised to a temperature a little higher than the transition temperature for glass. This heating can be carried out within an isothermal casing (not shown) at a separate location and the glass transported to the mold sections by the use of the robot arm 17 and the holding pad 16.

The temperature of the mold sections and optical material is maintained at $T_p$ for a time approximately mid-way between $t_4$ and $t_5$. This temperature can be referred to as the upper uniform temperature state, and it is maintained during the second time period. At time essentially $t_2$, as shown in FIG. 4(B), the upper mold section 12 is lowered and it applies molding pressure $P_5$ on the optical material for the first time to form the optical material into the shape of a lens 22. This is referred to as the first pressing or primary pressure step. The pressure $P_5$ is maintained for a time extending from $t_2$ to a time roughly midway between $t_4$ and $t_5$.

After the primary pressing step, the upper mold section is raised as shown in FIG. 4(C). The upper mold is kept in the raised position for a time sufficient to expel any gas that may be present and to permit the relief of any internal stress that may have been created within the shaped optical component 23 by the primary pressing step. This is referred to as the first mold release step. This release of pressure can take place somewhere between the times $t_4$ and $t_5$. The first temporary removal of all pressure from the lens during the first mold release step allows any internal heat stress within the optical material to be relieved. This eliminates the conventional heat stress defects that occur when a lens is formed by pressing. FIG. 4(D) shows the upper mold section again lowered and once again pressing on the optical material. This second pressing step applies an intermediate pressure that removes small deformations that are created in the lens 24 by the above-described release of stress in the lens. This eliminates the conventional problem known as "drop." The second pressing step is begun while the optical material is still in its soft or plastic state at, or near, the temperature $T_p$ and continues until the optical material has been gradually cooled to its solid state at temperature $T_s$. The time period of the controlled gradual cooling from $T_p$ to $T_s$ is referred to herein as the third time period. At the temperature $T_s$ the intermediate pressure is removed while the weight of the mold itself is maintained in contact with the lens 25 as depicted in FIG. 4(E). At this same time, the optical material is exposed to ambient or room temperature and is rapidly cooled to room temperature while the weight of the mold remains the only pressing force on the optical material. The period of rapid cooling of the optical material is referred to herein as the fourth time period. Once the optical material is at or near ambient or room temperature, the mold sections are separated so that the optical component such as a lens 26 can be removed as shown in FIG. 4(F).

Because the temperatures, pressures and time of application vary from one base optical material to another and from the various ingredients added to the base optical materials, the temperatures and pressures and times of application in the figures do not represent specific amounts or degrees. The basic steps indicated are the important concerns.

The transition temperature of glass depends on the composition of the glass. This can be expected to be in the range of 350 to 600 degrees Centigrade. At this temperature, the glass will have a viscosity in the range of $10^8$ to $10^{13}$ Poise and will be plastic enough to be molded. The pressure applied to the optical material for forming the initial shape of the lens will be approximately 200 to 1,000 kg/cm². This is the initial molding pressure during the primary molding step. After the initial formation of the optical component, such as a lens, the pressure is removed during a first mold release step. The first mold release step can last for up to 10 minutes. After the first mold release step, pressure is again applied to the lens. The second pressure application applies an intermediate pressure in the range from approximately 100 to 600 kg/cm². The second pressure is maintained while the temperature of the lens is controllably and gradually reduced. This gradual cooling takes place until a temperature of approximately 200 to 450 degrees Centigrade is reached. At this temperature the viscosity of the glass will be approximately $10^{12}$ to $10^{16}$ Poise. This cool-down period will take approximately 5 to 30 minutes. Once this gradual cool down step is completed, the application of intermediate pressure to the optical material ceases. However, the mold sections are maintained in contact with the optical material and the weight of the mold itself is kept on the optical material while the optical material is rapidly cooled by the surrounding air to room temperature. The weight of the upper mold section on the optical material will create a pressure of approximately 5 to 100 kg/cm². Once the temperature of the optical material approaches room temperature, or is otherwise cool enough to be removed from the mold, the mold sections can be separated and the optical material in the shape of an optical component such as a lens, may be removed. This will be referred to as the removal temperature. Of course, the mold sections may be oriented other than vertically. Further, rather than using the weight of the upper mold section to apply a light pressure to the optical material, the light pressure can be applied by using some other means, such as that used to apply the high and intermediate pressures.

Figure 5:
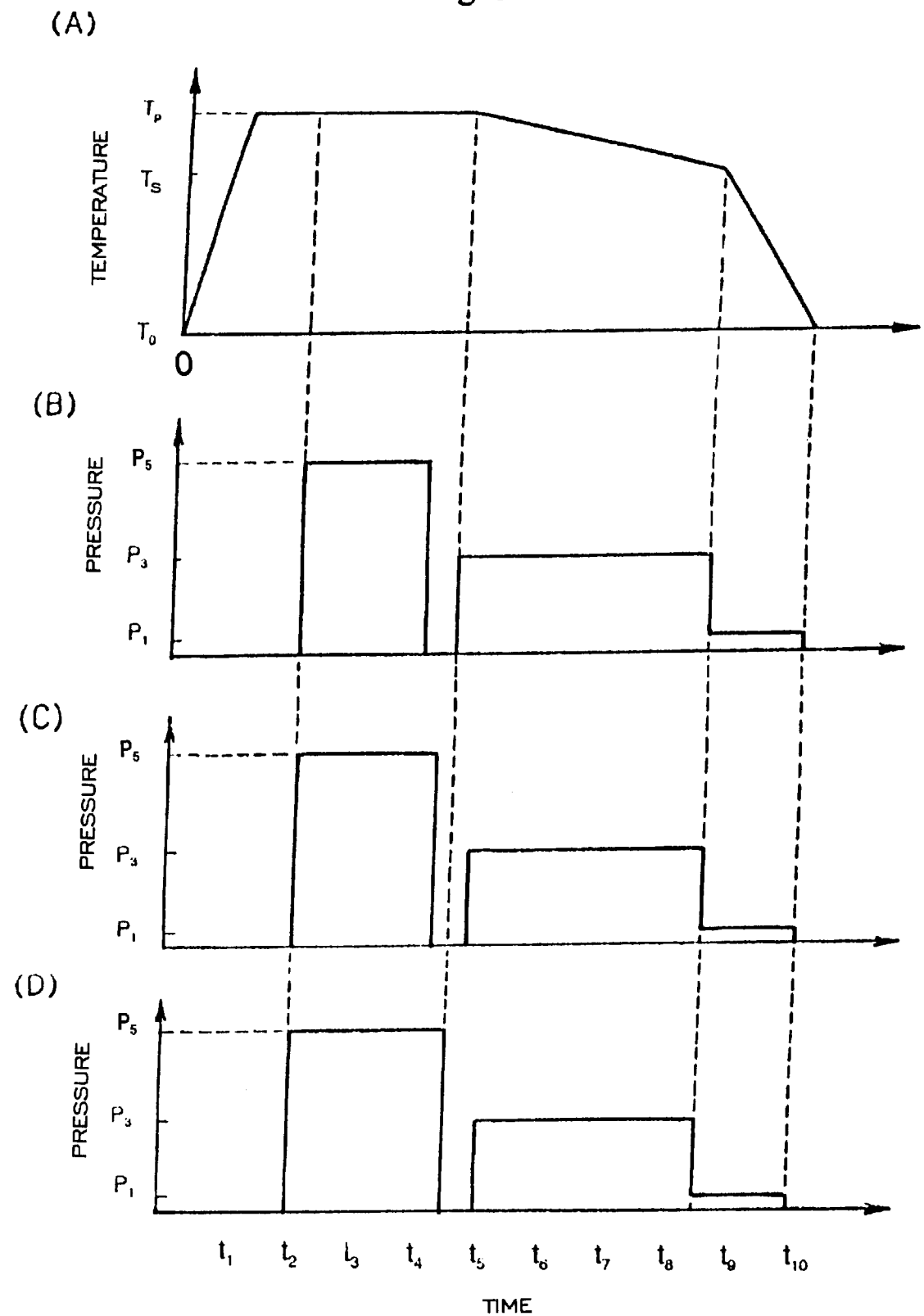
FIG. 5 shows the relationship between temperature and pressure versus time in a first procedure for forming an optical component according to the present invention.

FIG. 5 graphically shows a first procedure according to the present invention. FIG. 5(A) illustrates the temperature versus time on the optical material. As in FIG. 3(A), the vertical axis represents relative temperature, and the horizontal axis represents the passage of time. FIGS. 5(B), 5(C) and 5(D) show the application of pressure to the optical material versus time. As in FIGS. 3(B), 3(C) and 3(D), the vertical axis represents the relative amount of pressure being applied to the optical material and the horizontal axis represents the passage of time. The passage of time represented by the horizontal axes in FIGS. 5(A), 5(B), 5(C) and 5(D) are intended to represent the same time increments as represented in FIGS. 3(A). 3(B), 3(C) and 3(D).

In FIG. 5(A) the first time period (from time zero to $t_1$) is essentially the time during which the optical material is heated from room temperature $T_0$ to a temperature $T_p$ in its plastic state. The second time period represents the time during which the optical material is maintained in its plastic, moldable state. The second time period extends from $t_1$ to roughly midway between $t_4$ and $t_5$. The third time period is the time during which the optical material is gradually reduced from its plastic state temperature $T_p$ to a relatively solid state temperature $T_s$. The third time period begins about midway between $t_4$ and $t_5$ and ends about midway between $t_8$ and $t_9$. The fourth time period involves rapidly cooling the optical material from the solid state temperature $T_s$ to ambient or room temperature $T_0$. During this time, the optical material is subjected to ambient or room temperature without adding any heat. The fourth time period begins about midway between $t_8$ and $t_9$ and ends with the optical material reaching ambient or room temperature at $t_{10}$. With the optical material at ambient or room temperature and in the shape of the molded optical component, such as a lens, it can be safely removed from between the mold sections.

FIG. 5(B) represents the application of pressure during the four time periods discussed above. No pressure is applied to the optical material until the optical material has had time to reach its plastic, molding temperature $T_p$. At a time essentially $t_2$, molding pressure $P_5$ is applied onto the optical material by the mold sections. This molding pressure is maintained from time $t_2$ to time $t_4$. During this time, the optical material is pressed into the shape of an optical component, such as a lens. At the time $t_4$, the pressure between the mold sections and on the optical material is relieved and the mold sections are separated. This separation takes place while the optical material is still in its plastic state. The separation is maintained for a brief period of time after $t_4$ and allows for the escape of any trapped gas and the relief of any internal stress created in the lens. At the beginning of the third time period (i.e., about mid-way between $t_4$ and $t_5$ when the temperature of the optical material begins to be gradually cooled), the mold sections are again moved together and an intermediate pressure $P_3$, which is considerably less than the molding pressure $P_5$, is applied on the optical material. The intermediate pressure is maintained until the beginning of the fourth time period, as described above. At this time, all pressure created by the driving mechanism driving the mold sections is relieved; however, the upper and lower mold sections are maintained in contact with the optical material and the weight of the upper mold section is supported by the optical material so as to cause a pressure $P_1$ on the upper surface of the optical material during the fourth time period. At time $t_{10}$ (i.e., when the optical material has cooled to ambient or room temperature), the mold sections can be separated and the optical material shaped as an optical component such as a lens, may be removed.

FIG. 5(C) follows essentially the same temperature, time and pressure procedures followed in FIG. 5(B); however, the molding pressure $P_5$ is maintained a little longer and is removed just before the beginning of the gradual cooling of the lens material. The beginning of applying the intermediate pressure $P_3$ is also delayed until just after the gradual cooling of the lens material has begun.

FIG. 5(D) follows essentially the same temperature, time and pressure procedures followed in FIG. 5(B); however, the molding pressure $P_5$ is maintained a little longer and is not removed until the beginning of the third time period (i.e., when the gradual cooling of the optical material begins). The time for commencing application of the intermediate pressure $P_3$ is also delayed until a short period of time after the gradual cooling of the lens material has begun.

Figure 6:
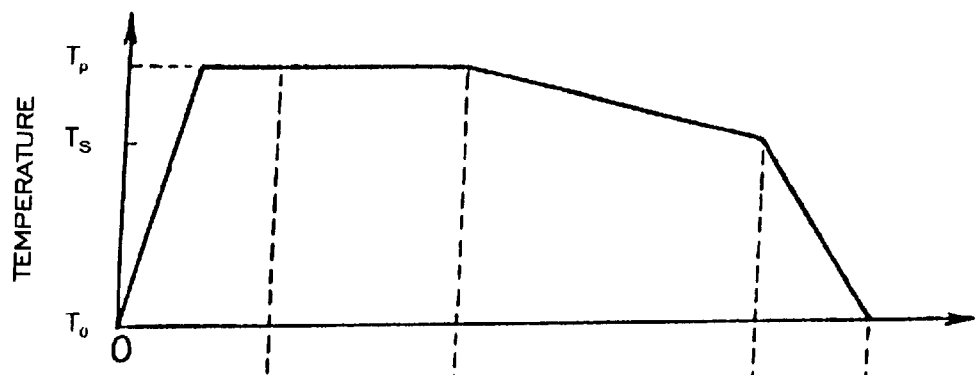
FIG. 6 shows the relationship between temperature and pressure versus time in a second procedure for forming an optical component according to the present invention.
Figure 6:
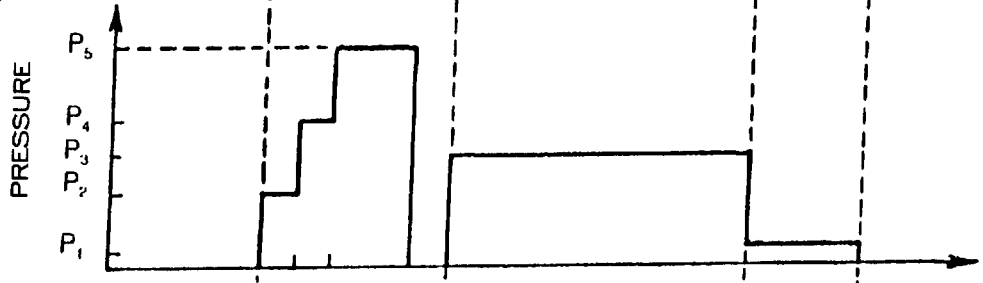
Figure 6:
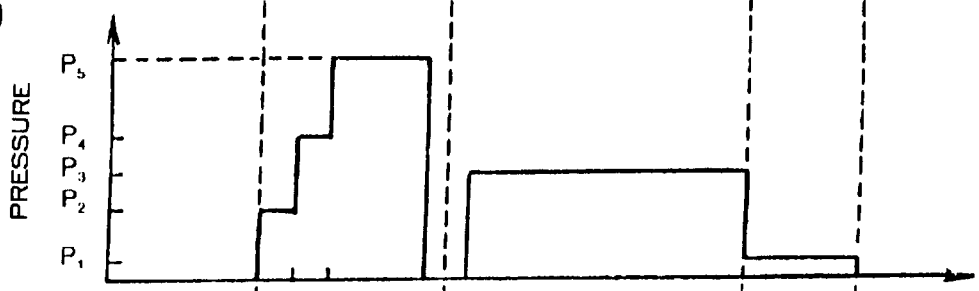
Figure 6:
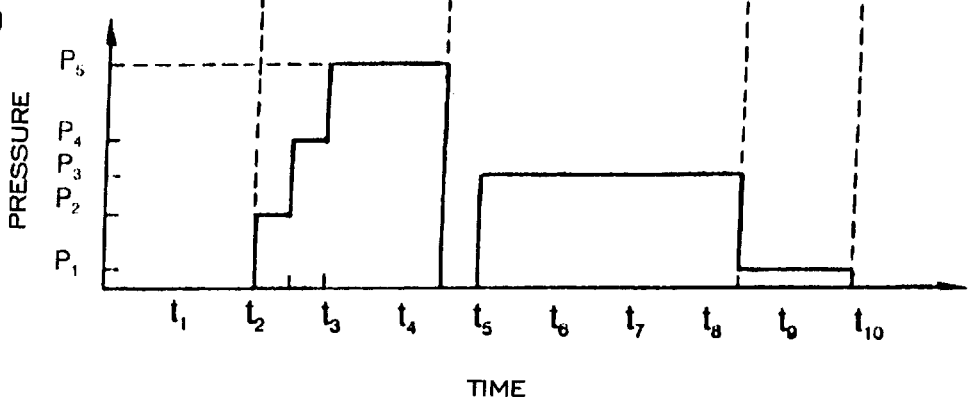

FIG. 6 is a modification of the procedure set forth in FIG. 5. The temperature versus time graph of FIG. 6(A) is essentially the same as that of FIG. 5(A). FIGS. 6(B), 6(C)

and 6(D) differ from FIGS. 5(B), 5(C) and 5(D), respectively, only in that the molding pressure $P_5$ is preceded by applying pressure in stages to the optical material. A pressure $P_2$, which is about one-third of the molding pressure $P_5$, is applied to the optical material at the time $t_2$. At time $t_3$ a pressure $P_4$, of about two-thirds of the molding pressure $P_5$, is applied to the optical material.

Figure 7:
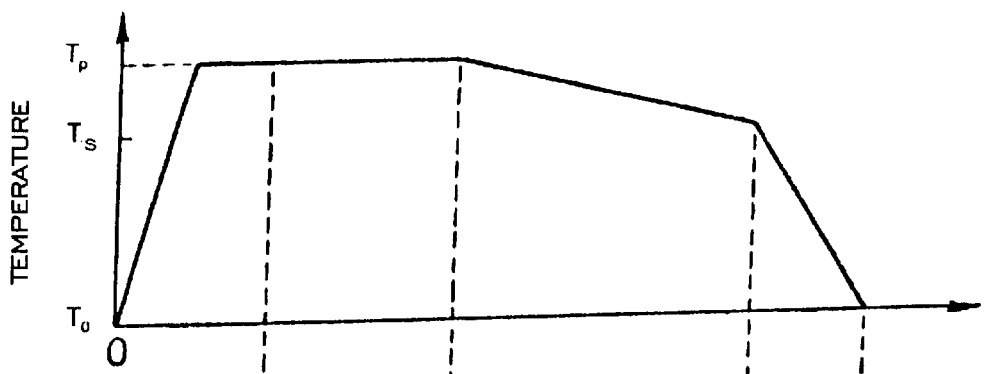
FIG. 7 shows the relationship between temperature and pressure versus time in a third procedure for forming an optical component according to the present invention; and, FIG. 8 shows the relationship between temperature and pressure versus time in a fourth procedure for forming an optical component according to the present invention.
Figure 7:
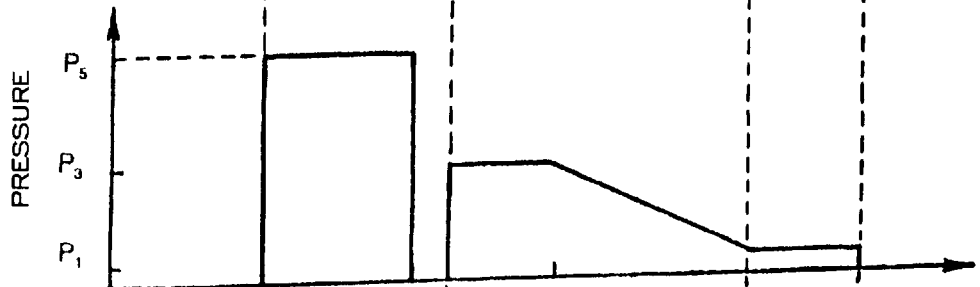
Figure 7:
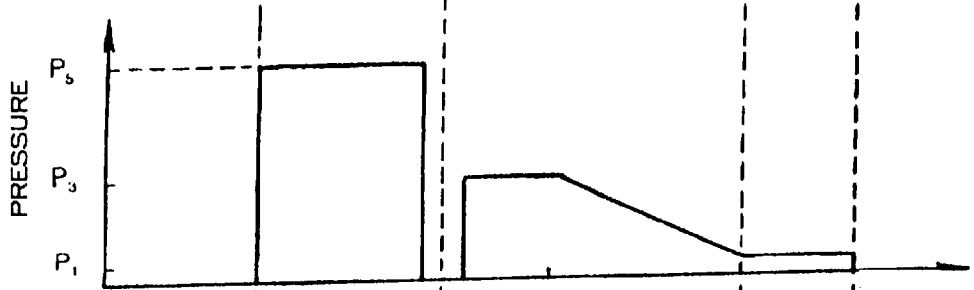
Figure 7:
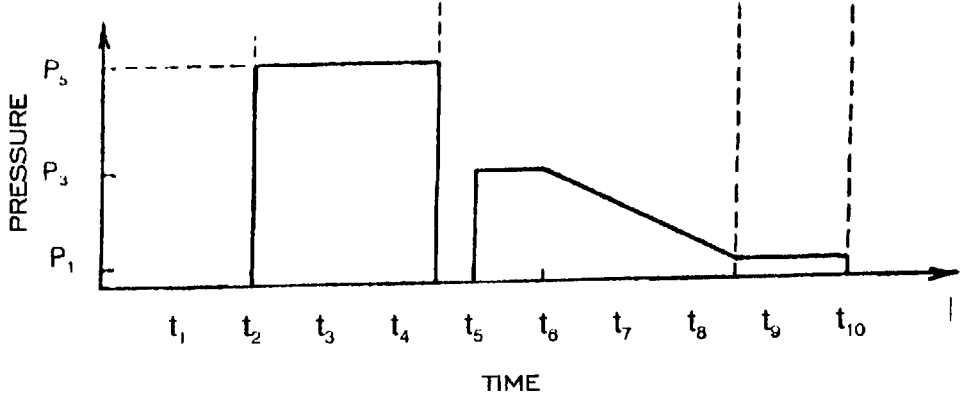

FIG. 7 is a modification of the procedure set forth in FIG. 5. The temperature and time graph in FIG. 7(A) is identical to that of FIG. 5(A). FIGS. 7(B), 7(C) and 7(D) differ from FIGS. 5(B), 5(C) and 5(D), respectively, in that the intermediate pressure $P_3$ is maintained only to time $t_6$, at which point the pressure on the optical material is gradually reduced until the only pressure is that resulting from the optical material supporting the weight of the upper mold section. This gradual reduction of pressure takes place from $t_6$ to a time midway between $t_s$ and $t_9$ when natural cooling commences upon the optical material reaching the temperature $T_s$. As in FIG. 5, the weight of the upper mold section is maintained on the optical material during the rapid cool down from $T_s$ to $T_0$.

Figure 8:
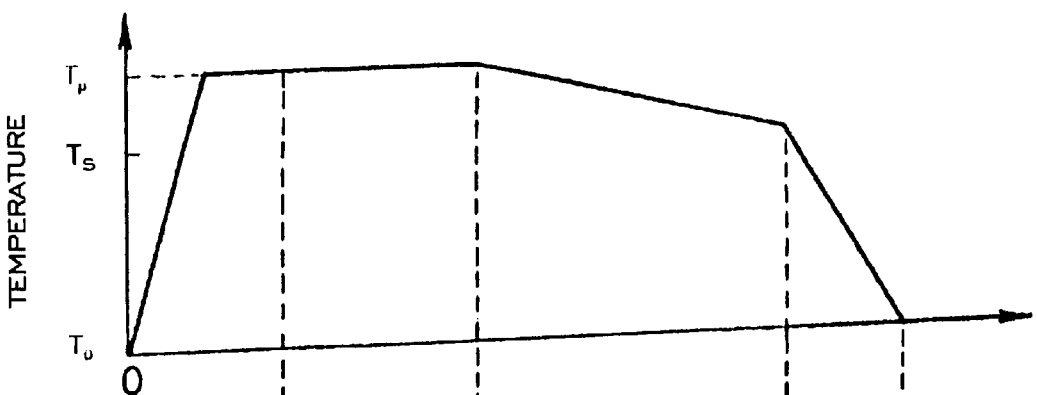
Figure 8:
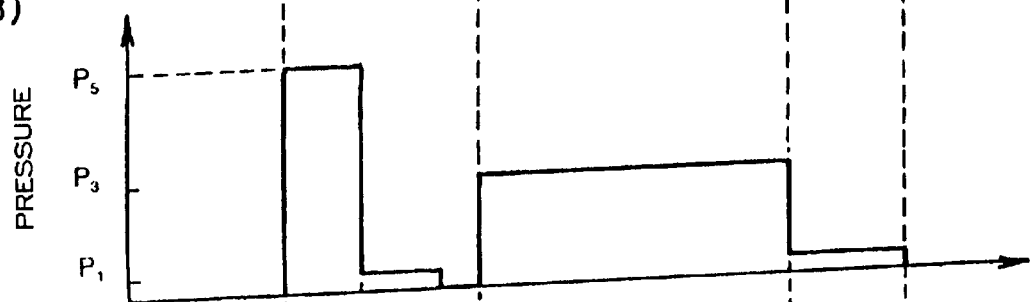
Figure 8:
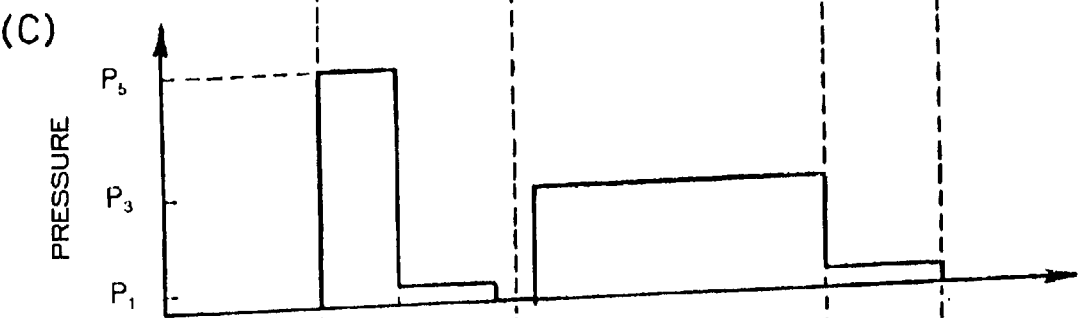
Figure 8:
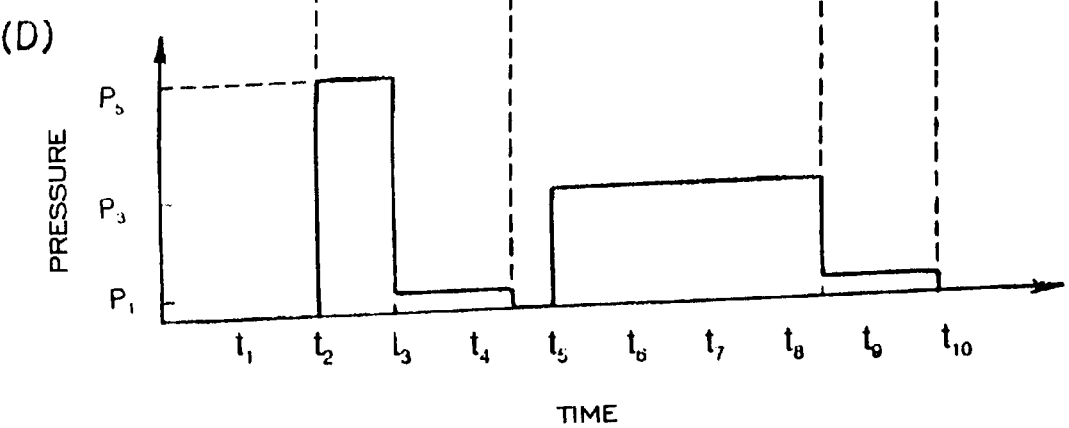

FIG. 8 is a modification of the procedure set forth in FIG. 5. The temperature versus time graph in FIG. 8(A) is identical to that of FIG. 5(A). FIGS. 8(B), 8(C) and 8(D) differ from FIGS. 5(B), 5(C) and 5(D), respectively, only in that the pressure $P_5$ on the optical material is reduced at time $t_3$ to the pressure $P_1$ (the pressure resulting from the weight of the upper mold section supporting the optical material). The pressure $P_1$ is then maintained on the optical material for the remaining amount of time that the total pressure was maintained in FIGS. 5(B), 5(C) and 5(D), respectively. The total release of pressure on the optical material takes place in FIGS. 8(B), 8(C) and 8(D) at the same respective time there was a total release of pressure on the optical material in FIGS. 5(B), 5(C) and 5(D), respectively. Also, the same intermediate pressure $P_3$ amount and same pressure $P_1$ amount, as well as the time of their respective application, which occurs in FIGS. 8(B), 8(C) and 8(D) occurs in FIGS. 5(B), 5(C) and 5(D), respectively.

The invention being thus described, it will be obvious that the same may be varied in many ways. For example, any optical material that can be molded can be used in the process. The optical component manufactured by the process can be a lens of convex, concave, or meniscus shape, a mirror, a prism, or any other optical component capable of being formed by a mold. The method of the present invention can be performed using different mold section orientations than those described, such as horizontal or slanted. The process steps can be performed more than once, and the application of pressure to the optical material may be performed in stages or linearly. Any mold section alignment slippage prevention means can be used and any mold section separation device can be used. The mold release can be at any desired temperature and either or both mold sections can be moved to release the finished optical component. Such variations are not to be regarded as a departure from the spirit and scope of the invention. Rather the scope of the invention shall defined as set forth in the following claims and their legal equivalents. All such modifications as would be obvious to one skilled in the art are intended to be included within the scope of the following claims.

What is claimed is:

1. A method of molding an optical component comprising the steps of:

placing an optical material as a ball or oval shape, between upper and lower mold sections of a molding apparatus;

heating said optical material until it reaches its plastic state;

applying a molding pressure to press said optical material into the shape of said optical component using said mold sections while maintaining said optical material in its plastic state;

separating said mold sections to remove all pressure, including any pressure resulting from said optical material supporting any weight of the upper mold section, from said optical material, thereby relieving internal stress in said optical component while said optical material is in its plastic state;

decreasing the spacing between said mold sections so as to apply an intermediate pressure to said optical material, said intermediate pressure being greater than the pressure resulting from said optical material supporting the weight of the upper mold section and less than said molding pressure, while reducing the temperature of said optical material from its plastic state to below its plastic state;

removing said intermediate pressure from said optical material while maintaining said mold sections in contact with said optical material while keeping a reduced pressure, that is less than said intermediate pressure, on said optical material;

cooling said optical material until a removal temperature is reached; and separating said mold sections and removing said optical component from said molding apparatus.

2. The method of molding an optical component according to claim 1, wherein said reduced pressure is produced by the weight of said upper mold section on said optical material.

3. The method of molding an optical component according to claim 1, wherein the reducing of the temperature of said optical material from its plastic state to below its plastic state is a gradual, controlled reduction in temperature.

4. The method of molding an optical component according to claim 1, wherein said applying said molding pressure is preceded by applying pressure in stages.

5. The method of molding an optical component according to claim 4 wherein:

a first stage applies about one-third of the molding pressure; and a second stage applies about two-thirds of the molding pressure.

6. The method of molding an optical component according to claim 2 wherein, after said intermediate pressure has been applied for a time, said intermediate pressure is gradually reduced until the only pressure on said optical material is that resulting from supporting the weight of said upper mold section.

7. The method of molding an optical component according to claim 1 wherein:

prior to removing all pressure from said optical material, including any pressure resulting from said optical material supporting any weight of the upper mold section, said molding pressure is removed while said mold sections remain in contact with said optical material and the upper mold section applies a reduced pressure, that is less than said intermediate pressure, on said optical material.

8. The method of molding an optical component according to claim 3 wherein:

the separating of said mold sections in order to remove all pressure from said optical material, including any pressure resulting from said optical material supporting any weight of the upper mold section, occurs before said plastic-state temperature of said lens is gradually reduced.

9. The method of molding an optical component according to claim 3 wherein:

the separating of said mold sections to remove from said optical material all pressure, including any pressure resulting from said optical material supporting any weight of the upper mold section, occurs during the time the temperature of said optical material is gradually reduced from said plastic-state.

10. The method of molding an optical lens according to claim 3 wherein:

the separating of said mold sections in order to remove from said optical material all pressure, including any pressure resulting from said optical material supporting any weight of the upper mold section, occurs after the temperature of said optical material begins to be gradually reduced from said plastic-state.

11. A method of molding an optical component using a molding apparatus and optical material that is in a ball or oval shape prior to being molded by said molding apparatus, said method comprising:

(1) providing temperature control of upper and lower mold sections of said molding apparatus and of optical material placed between said mold sections during time periods including:
 (a) heating said mold sections and said optical material from room temperature to a plastic state temperature of said optical material over a first time period,
 (b) adding enough heat to said mold sections and said optical material to maintain said optical material at said plastic state temperature during a second time period,
 (c) reducing said heat input to said mold sections and said optical material, thereby reducing the temperature of said optical material to a temperature below its plastic state during a third time period, and,
 (d) discontinuing the addition of heat to said mold sections and said optical material during a fourth time period; and (2) simultaneously controlling the pressure between said mold sections and the pressure on said optical material including:
 (a) separating said mold sections during said first time period while heating said optical material to its said plastic state temperature,
 (b) bringing said mold sections together and applying a molding pressure on said optical material during said second time period while said optical material is in said plastic state, thereby forming said optical material into the shape of an optical component such as a lens,
 (c) separating said mold sections in order to apply no pressure to said optical material, including any pressure resulting from said optical material supporting any weight of the upper mold section, while said optical material is in its plastic state,
 (d) reducing the distance between said mold sections to thereby apply an intermediate pressure on said optical material during said third time period,
 (e) removing said intermediate pressure from said mold sections and maintaining said mold sections in contact with said optical material while applying a light pressure on said optical material during said fourth time period.

12. The method of molding an optical component according to claim 11 wherein:

said mold sections are an upper mold section and a lower mold section and said applying a light pressure on said optical material is due to said optical material supporting the weight of said upper mold section.

13. The method of molding an optical component according to claim 11 wherein:

said reducing the temperature of said optical material from its plastic state to a temperature below its plastic state is a gradual, controlled reduction in temperature.

14. The method of molding an optical component according to claim 11 wherein:

said applying said molding pressure is preceded by applying pressure in stages during said second time period.

15. The method of molding an optical component according to claim 14 wherein:

a first stage applies about one-third of said molding pressure; and a second stage applies about two-thirds of said molding pressure.

16. The method of molding an optical component according to claim 12 wherein:

after said intermediate pressure has been applied for a time during said third time period, said intermediate pressure is gradually removed until the only pressure on said optical material is the pressure resulting from the weight of said upper mold section weight being supported by said optical material.

17. The method of molding an optical component according to claim 11 wherein:

prior to separating said mold sections in order to apply no pressure to said optical material, including any pressure resulting from said optical material supporting any weight of the upper mold section, said molding pressure is removed from said mold sections while maintaining contact of said mold sections with said optical material and applying a light pressure on said optical material during said second time period.

18. The method of molding an optical component according to claim 13 wherein:

said separating said mold sections in order to apply no pressure to said optical material, including any pressure resuming from said optical material supporting any weight of the upper mold section, commences in the second time period.

19. The method of molding an optical component according to claim 18 wherein:

said applying no pressure to said optical material including any pressure resulting from said optical material supporting any weight of the upper mold section, continues for a time into said third time period.

20. The method of molding an optical component according to claim 13 wherein:

said applying no pressure to said optical material, including any pressure resulting from said optical material supporting any weight of the upper mold section, commences with the beginning of said third time period.

* * * * *

UNITED STATES PATENT AND TRADEMARK OFFICE
CERTIFICATE OF CORRECTION

PATENT NO : 6,099,765
DATED : Aug. 8, 2000
INVENTOR(S): Yamanaka et al.

It is certified that error appears in the above-identified patent and that said Letters Patent are hereby corrected as shown below:

At column 1, line 56, change "staring" to -- starting --;
At column 2, line 5, change "H069228" to -- H06-9228 --;
At column 4, line 20, insert a period after "arm"; and,
In claim 1, at line 65 of column 9, insert a comma after "material".

Signed and Sealed this

Seventeenth Day of April, 2001

Attest:

NICHOLAS P. GODICI

Attesting Officer

Acting Director of the United States Patent and Trademark Office